United States Patent
Dumpala et al.

(10) Patent No.: US 9,918,348 B2
(45) Date of Patent: Mar. 13, 2018

(54) DEVICE-TO-DEVICE RELAY SELECTION

(71) Applicant: QUALCOMM Incorporated, San Diego, CA (US)

(72) Inventors: Karthik Dumpala, Hyderabad (IN); Sandeep Choudavada, Hyderabad (IN); Naveen Kumar Pasunooru, Hyderabad (IN); Phani Kumar Pallapothu, Hyderabad (IN); Kartheek Surathu, Hyderabad (IN); Janga Reddy Alimineti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 14/809,204

(22) Filed: Jul. 25, 2015

(65) Prior Publication Data

US 2017/0027009 A1 Jan. 26, 2017

(51) Int. Cl.
*H04W 76/02* (2009.01)
*H04W 48/00* (2009.01)
(Continued)

(52) U.S. Cl.
CPC ...... *H04W 76/023* (2013.01); *H04B 7/15507* (2013.01); *H04B 17/309* (2015.01); *H04W 48/17* (2013.01); *H04W 88/04* (2013.01)

(58) Field of Classification Search
CPC ... H04W 88/04; H04W 72/085; H04W 76/02; H04W 40/02; H04W 40/12;
(Continued)

(56) References Cited

U.S. PATENT DOCUMENTS 8,446,856 B2    5/2013   Womack et al.
2013/0107736 A1*  5/2013   Yamada ............... H04W 48/18
                                                      370/252
(Continued)

FOREIGN PATENT DOCUMENTS

WO    2012037637 A1   3/2012
WO    2013169974 A1   11/2013
WO    2015122808 A1   8/2015

OTHER PUBLICATIONS

International Search Report and Written Opinion—PCT/US2016/034002—ISA/EPO—Aug. 2, 2016.
(Continued)

*Primary Examiner* — Awet Haile
(74) *Attorney, Agent, or Firm* — MG-IP Law, P.C.

(57) ABSTRACT

Systems and methods are disclosed for selecting a relay device for device-to-device communication with a target device in a partial coverage scenario. The method may include determining that the wireless device is out-of-service, detecting a set of candidate relay devices, identifying one or more communication parameters associated with each candidate relay device of the set of candidate relay devices, calculating a selection metric associated with each candidate relay device of the set of candidate relay devices based on the identified one or more communication parameters, selecting at least one candidate relay device from the set of candidate relay devices based on the selection metric, and transmitting the data to the selected at least one relay device.

22 Claims, 7 Drawing Sheets

(51) Int. Cl.
*H04B 7/155* (2006.01)
*H04B 17/309* (2015.01)
*H04W 88/04* (2009.01)

(58) Field of Classification Search
CPC ... H04W 52/243; H04W 52/46; H04W 40/22; H04W 52/245; H04W 72/02; H04L 2001/0097; H04L 1/0001; H04L 67/104
See application file for complete search history.

(56) References Cited

U.S. PATENT DOCUMENTS

| | | | |
|---|---|---|---|
| 2013/0132501 A1 | 5/2013 | Vandwalle et al. | |
| 2014/0162688 A1 | 6/2014 | Edge | |
| 2015/0009949 A1 | 1/2015 | Khoryaev et al. | |
| 2016/0037568 A1* | 2/2016 | Hakola | H04W 8/005 370/329 |

OTHER PUBLICATIONS

Munir D., et al., "Selection of UE Relay Considering QoS Class for Public Safety Services in LTE-A Network", The 20th Asia-Pacific Conference on Communication (APCC2014), IEEE, Oct. 1, 2014 (Oct. 1, 2014), pp. 401-405, XP032765631, DOI: 10.1109/APCC.2014.7092845 [retrieved on Apr. 22, 2015].

Sony: "UE-to-Network Relay Measurements and Selection/Reselection (alt.1)", 3GPP Draft; R2-152436 D2D Relay Measurements, 3rd Generation Partnership Project (3GPP), Mobile Competence Centre; 650, Route Des Lucioles ; F-06921 Sophia-Antipolis Cedex ; France vol. RAN WG2, No. Fukuoka, Japan; 20150525-20150529 May 15, 2015 (May 5, 2015), XP050971069, Retrieved from the Internet: URL: http://www.3gpp.org/ftp/tsg_ran/WG2_RL2/TSGR2_90/Docs/[retrieved on May 15, 2015].

ZTE: "Discussions on Relay UE selection and discovery", 3GPP Draft; R1-153414 Relay UE Selection and Discovery Revised, 3rd Generation Partnership Project (3GPP), Mobile Competence Centre; 650, Route Des Lucioles ; F-06921 Sophia-Antipolis Cedex; France vol. RAN WG1, No. Fukuoka, Japan; 20150525-20150529 May 22, 2015 (May 22, 2015), XP050977778, Retrieved from the Internet: URL: http://www.3gpp.org/ftp/tsg_ran/WG1_RL_1/TSGR1_81/Docs/ [retrieved on May 22, 2015].

\* cited by examiner

DEVICE-TO-DEVICE RELAY SELECTION

BACKGROUND OF THE INVENTION

Aspects of this disclosure relate to wireless communication systems. In particular, aspects of this disclosure relate to selecting a relay device for device-to-device communication with a target device in a partial coverage scenario.

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems.

Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies. More recently, Long Term Evolution (LTE) has been developed as a wireless communication protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

In recent years, use of device-to-device (D2D) communications has increased. Examples of D2D communications (also known as peer-to-peer (P2P) communications) include Bluetooth Low Energy (BTLE), WiFi-Direct, WiFi Aware, and LTE-Direct (LTE-D).

D2D communication protocols enable devices to discover one another and establish a D2D network. An access point can configure an interval at which devices announce themselves, allocate channel resources for D2D network communications, etc. However, when a wireless device is out of coverage, it becomes problematic to establish or maintain D2D communications with wireless devices that are in coverage. This may be referred to as a partial coverage scenario. Accordingly, solutions are needed for selecting a relay device for device-to-device communication with a target device in a partial coverage scenario.

SUMMARY

In one aspect, the present disclosure provides a method of operating a wireless device. The method may comprise, for example, identifying data for transmission to a target device, determining that the wireless device is out-of-service with respect to a target wireless network associated with the target device, detecting a set of candidate relay devices, identifying one or more communication parameters associated with each candidate relay device of the set of candidate relay devices, calculating a selection metric associated with each candidate relay device of the set of candidate relay devices based on the identified one or more communication parameters, selecting at least one candidate relay device from the set of candidate relay devices based on the selection metric, and transmitting the data to the selected at least one relay device.

In another aspect, the present disclosure provides a wireless device. The wireless device may comprise, for example, a communication device configured to identify data for transmission to a target device, determine that the wireless device is out-of-service with respect to a target wireless network associated with the target device, detect a set of candidate relay devices, and transmit the data to the target device via a selected at least one relay device, an identification manager configured to identify one or more communication parameters associated with each candidate relay device of the set of candidate relay devices, a metric analyzer configured to calculate a selection metric associated with each candidate relay device of the set of candidate relay devices based on the identified one or more communication parameters, and a relay device selector configured to select at least one candidate relay device from the set of candidate relay devices based on the selection metric.

In yet another aspect, the present disclosure provides an apparatus for selecting a relay device. The apparatus may comprise, for example, means for identifying data for transmission to a target device, means for determining that the wireless device is out-of-service with respect to a target wireless network associated with the target device, means for detecting a set of candidate relay devices, means for identifying one or more communication parameters associated with each candidate relay device of the set of candidate relay devices, means for calculating a selection metric associated with each candidate relay device of the set of candidate relay devices based on the identified one or more communication parameters, means for selecting at least one candidate relay device from the set of candidate relay devices based on the selection metric, and means for transmitting the data to the selected at least one relay device.

In yet another aspect, the present disclosure provides a computer-readable medium comprising code, which, when executed by a processor, causes the processor to perform operations for selecting a relay device. The computer-readable medium may comprise, for example, code for identifying data for transmission to a target device, code for determining that the wireless device is out-of-service with respect to a target wireless network associated with the target device, code for detecting a set of candidate relay devices, code for identifying one or more communication parameters associated with each candidate relay device of the set of candidate relay devices, code for calculating a selection metric associated with each candidate relay device of the set of candidate relay devices based on the identified one or more communication parameters, code for selecting at least one candidate relay device from the set of candidate relay devices based on the selection metric, and code for transmitting a signal to the selected at least one relay device.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention disclosed in the following description and related drawings are directed to specific embodiments of the invention. Alternate embodiments may be devised without departing from the scope of the invention. Additionally, well-known elements of the invention will not be described in detail, or will be omitted, so as not to obscure the relevant details of the invention. The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage, or mode of operation. Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A wireless device may be mobile or stationary, and may communicate with a radio access network (RAN). As used herein, the term "wireless device" may be referred to interchangeably as an "access terminal" or "AT", a "wireless device", a "subscriber device", a "subscriber terminal", a "subscriber station", a "user terminal" or "UT", a "user equipment" or "UE", a "mobile terminal", a "mobile station" and variations thereof. Generally, wireless devices can communicate with a core network via the RAN, and through the core network the wireless devices can be connected with external networks such as the Internet. Of course, other mechanisms of connecting to the core network and/or the Internet are also possible for the wireless devices, such as over wired access networks, WiFi networks (for example, based on IEEE 802.11, etc.) and so on. Wireless devices can be embodied by any of a number of types of devices including but not limited to PC cards, compact flash devices, external or internal modems, wireless or wireline phones, and so on.

Figure 1:
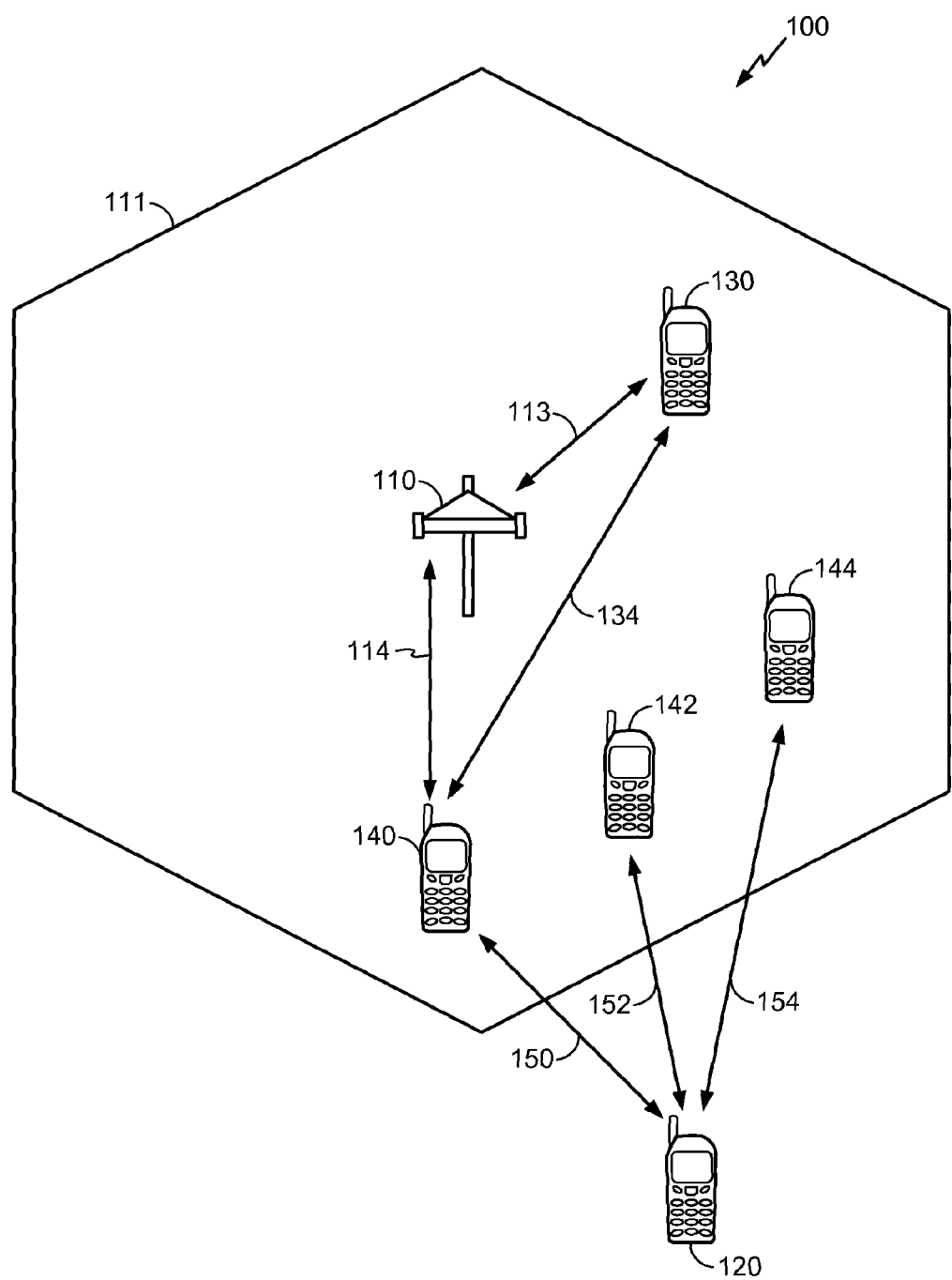
FIG. 1 generally illustrates a wireless environment in which a wireless device performs relay selection in accordance with an aspect of the disclosure.

FIG. 1 generally illustrates a wireless environment 100 that includes an access point 110 and several wireless devices 120, 130, 140, 142, 144. The access point 110 has a coverage area 111. Wireless devices within the coverage area 111 (for example, wireless devices 130, 140, 142, 144) can generally communicate with the access point 110. Generally, a wireless device that is in the coverage area 111 may be referred to as an "in-service" wireless device, whereas a wireless device that is not in the coverage area 111 (for example, wireless device 120) may be referred to as an "out-of-service" wireless device.

Wireless devices that share a coverage area may form D2D networks. Examples of D2D communications (also known as peer-to-peer (P2P) communications) include Bluetooth Low Energy (BTLE), WiFi-Direct, WiFi Aware, and LTE-Direct (LTE-D). When a plurality of wireless devices that share the coverage area 111 form a D2D network, this may be referred to as a "full coverage" scenario. However, a D2D network can also be formed between wireless devices that are both outside of a coverage area (an "out-of-coverage" scenario) and between a wireless device that is in-service and a wireless device that is out-of-service (a "partial coverage" scenario).

In a partial coverage scenario, the D2D network is maintained using D2D synchronization signals (D2DSS). The D2DSS is transmitted by an in-service wireless device that is within the coverage area. By receiving the D2DSS from an in-service wireless device (or a plurality of in-service wireless devices), the out-of-service wireless device can maintain synchronization with the D2D network.

FIG. 1 depicts a wireless device 120 that is outside the coverage area 111 of the access point 110. The access point 110 may be implemented using a WiFi access point, base station, eNode B, etc. In the scenario depicted in FIG. 1, the wireless device 120 is attempting to establish or maintain a D2D network with a target device 130, which is inside the coverage area 111 of the access point 110. Accordingly, the coverage area 111 associated with the target device 130 may be referred to as a target wireless network. Additionally or alternatively, the coverage area 111 associated with one or more of the candidate relay devices 140, 142, 144 may be referred to as the target wireless network.

Moreover, in the scenario depicted in FIG. 1, a D2D network can not be established or maintained between the wireless device 120 and the target device 130. For example, the range between the wireless device 120 and the target device 130 may be too great for D2D communications. As a result, it is necessary to use an intermediary to relay communications from the wireless device 120 to the target device 130 (or vice-versa). The wireless device 120 may determine that an intermediary is necessary by detecting that a signal strength associated with communications does not exceed (or no longer exceeds) a signal strength threshold.

After the wireless device 120 determines that a D2D network can not be established with the target device 130 without an intermediary, the wireless device 120 attempts to identify one or more potential intermediaries. In the scenario depicted in FIG. 1, there are three potential intermediaries, referred to herein as candidate relay devices 140, 142, 144. The candidate relay devices 140, 142, 144 are depicted as smartphones, but it will be understood that the candidate relay devices may be any devices capable of wireless communication using D2D protocols, for example, any other mobile wireless device (for example, laptop, tablet, etc.) or any stationary device that is configured to relay D2D signals in a D2D network (for example, fixed wireless devices, dedicated relay devices, etc.). Although three candidate relay devices are shown, it will be understood that there may be more or fewer candidate relay devices. The set of candidate relay devices may consist of, for example, the wireless devices from which the wireless device 120 receives a D2DSS.

In the partial coverage scenario depicted in FIG. 1, wireless links 150, 152, 154 have been established between the out-of-service wireless device 120 and each of the respective candidate relay devices 140, 142, 144. The D2DSS that the wireless device 120 uses to maintain synchronization with the D2D network may be transmitted, for example, from each of the candidate relay devices 140, 142, 144. The candidate relay devices 140, 142, 144 may transmit the D2DSS to the wireless device 120 via respective wireless links 150, 152, 154.

In accordance with an aspect of the disclosure, the wireless device 120 selects a relay wireless device from among the plurality of candidate relay devices 140, 142, 144. The relay device may be selected in accordance with a relay selection/reselection algorithm as set forth in the present disclosure. Depending on the context in which it is used, the term "selection" may herein refer broadly to selection or reselection, as appropriate.

In the example illustration of FIG. 1, the out-of-service wireless device 120 selects the candidate relay device 140 as the relay device. Once the candidate relay device 140 is selected as the relay device, the wireless device 120 can use the candidate relay device 140 to communicate with the target device 130. In one implementation, the candidate relay device 140 may communicate with the target device 130 via a wireless link 134. The wireless link 134 may perform communications using communication protocols of the D2D network. In an alternative implementation, the candidate relay device 140 uses the access point 110 as a relay. In this alternative implementation, the candidate relay device 140 communicates with the target device 130 via a wireless link 114 established between the candidate relay device 140 and the access point 110 and a wireless link 113 established between the access point 110 and the target device 130.

Figure 2:
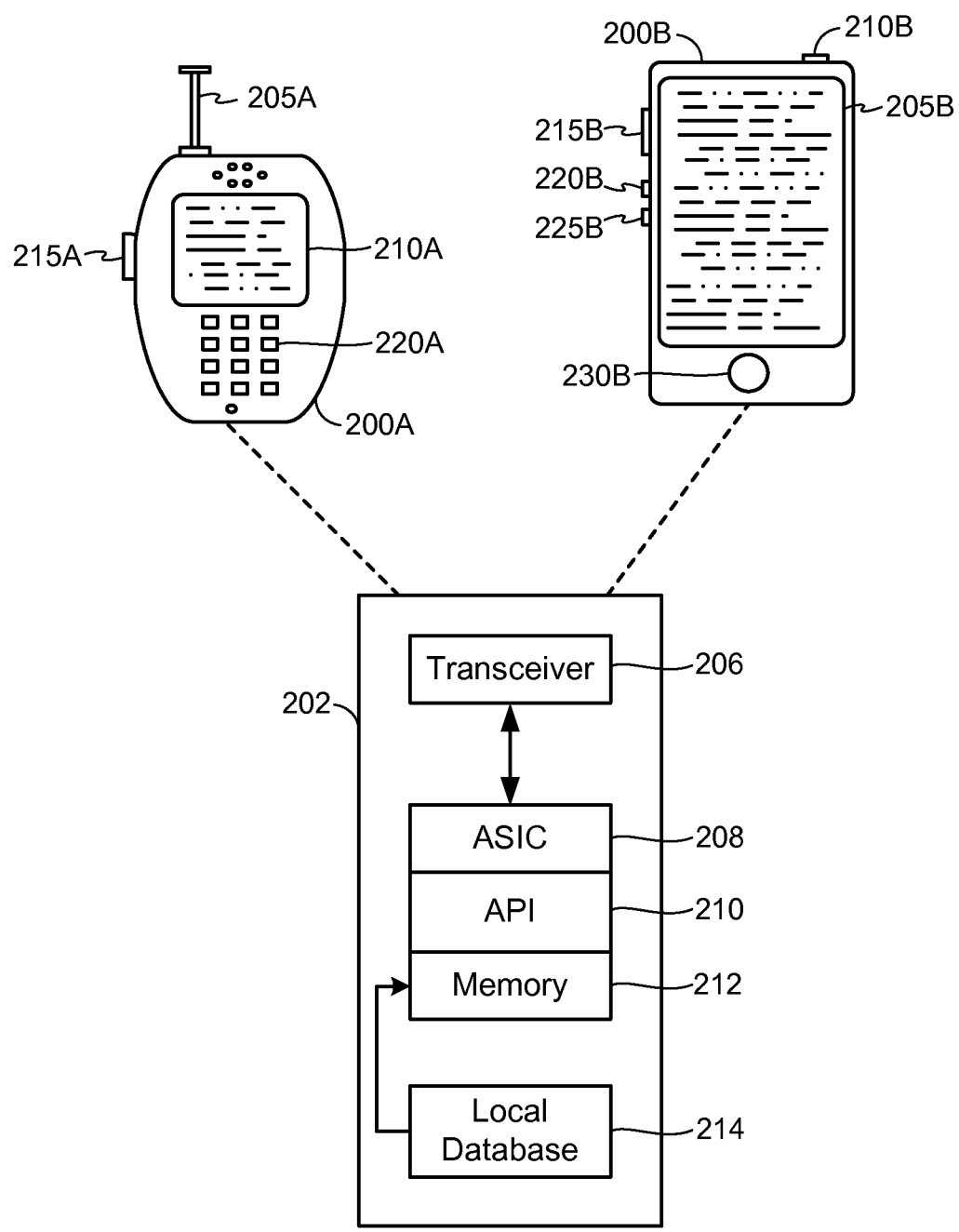
FIG. 2 generally illustrates examples of wireless devices in accordance with aspects of the disclosure.

FIG. 2 generally illustrates examples of wireless devices in accordance with embodiments of the invention. Referring to FIG. 2, wireless device 200A is illustrated as a calling telephone and wireless device 200B is illustrated as a touchscreen device (for example, a smart phone, a tablet computer, etc.). As shown in FIG. 2, an external casing of the wireless device 200A is configured with an antenna 205A, display 210A, at least one button 215A (for example, a PTT button, a power button, a volume control button, etc.) and a keypad 220A among other components, as is known in the art. Also, an external casing of the wireless device 200B is configured with a touchscreen display 205B, peripheral buttons 210B, 215B, 220B and 225B (for example, a power control button, a volume or vibrate control button, an airplane mode toggle button, etc.), at least one front-panel button 230B (for example, a Home button, etc.), among other components, as is known in the art. While not shown explicitly as part of the wireless device 200B, the wireless device 200B can include one or more external antennas and/or one or more integrated antennas that are built into the external casing of the wireless device 200B, including but not limited to WiFi antennas, cellular antennas, satellite position system (SPS) antennas (for example, global positioning system (GPS) antennas), and so on.

While internal components of wireless devices such as the wireless devices 200A and 200B can be embodied with different hardware configurations, a basic high-level wireless device configuration for internal hardware components is shown as platform 202 in FIG. 2. The platform 202 can receive and execute software applications, data, and/or commands transmitted from the RAN that may ultimately come from the core network, the Internet, and/or other remote servers and networks (for example, application servers, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208, or other processor, executes the application programming interface (API) 210 layer that interfaces with any resident programs in the memory 212 of the wireless devices 200A or 200B. The memory 212 can be comprised of read-only or random-access memory (RAM and ROM), EEPROM, flash cards, or any memory common to computer platforms. The platform 202 also can include a local database 214 that can store applications not actively used in the memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a wireless device (for example, wireless device 200A, 200B, etc.) including the ability to perform the functions described herein. As will be appreciated by those skilled in the art, the various logic elements can be embodied in discrete elements, software modules executed on a processor, or any combination of software and hardware to achieve the functionality disclosed herein. For example, the ASIC 208, memory 212, API 210 and the local database 214 may all be used cooperatively to load, store and execute the various functions disclosed herein and thus the logic to perform these functions may be distributed over various elements. Alternatively, the functionality could be incorporated into one discrete component. Therefore, the features of the wireless devices 200A and 200B in FIG. 2 are to be considered merely illustrative, and the invention is not limited to the illustrated features or arrangements.

Figure 3:
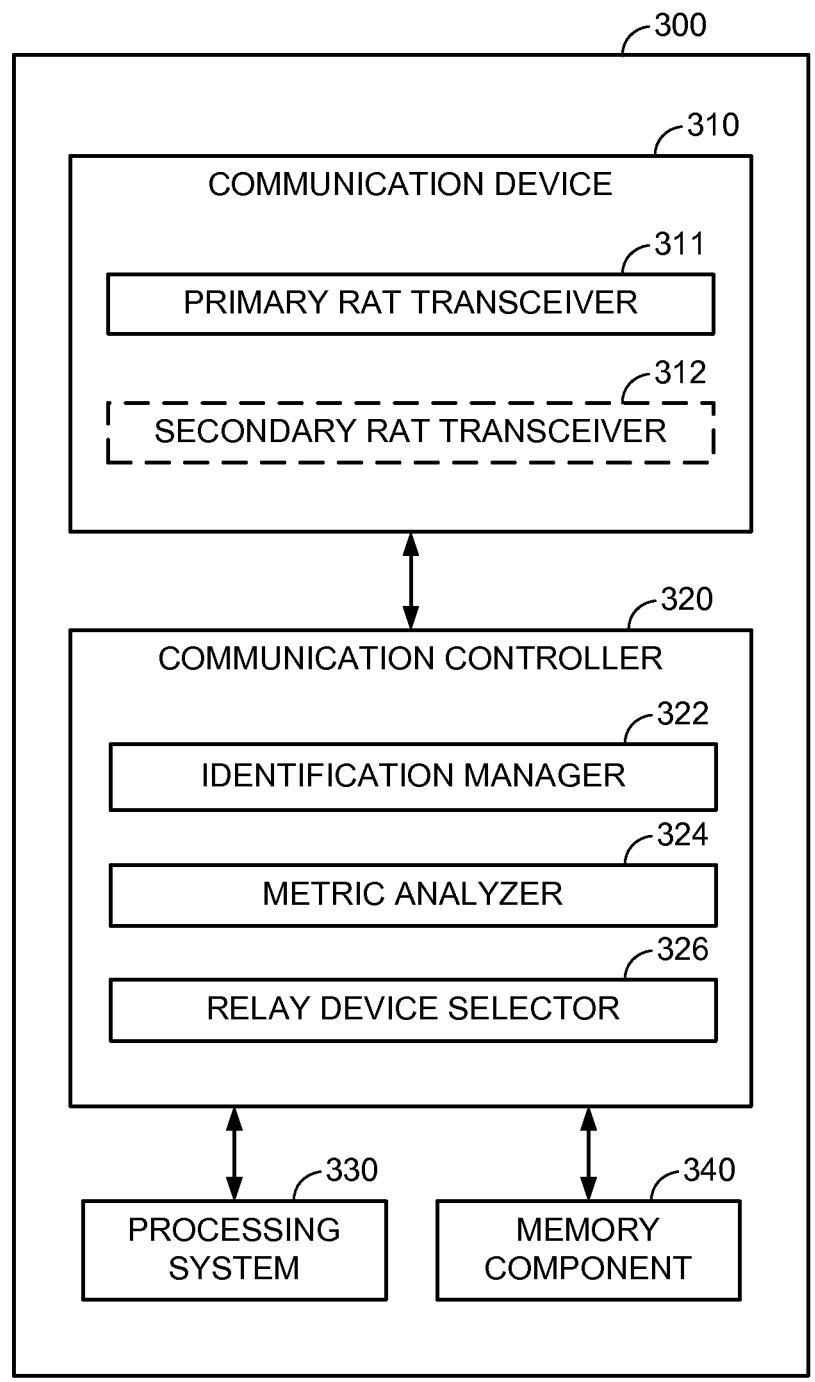
FIG. 3 generally illustrates a wireless device configured to select or reselect a relay in accordance with an aspect of the disclosure.

FIG. 3 generally illustrates a wireless device 300 configured to select or reselect a relay in accordance with an aspect of the disclosure. In general, the wireless device 300 may be any wireless communication device allowing a user to communicate over a communications network (for example, a mobile phone, router, personal computer, server, entertainment device, Internet of Things (IOT)/Internet of Everything (IOE) capable device, in-vehicle communication device, etc.). The wireless device 300 may operate according to one or several radio access technologies (RATs).

The wireless device 300 generally includes a communication device 310 for communicating with other network nodes via at least one designated RAT. The communication device 310 may be variously configured for transmitting and encoding signals (for example, messages, indications, information, etc.), and, conversely, for receiving and decoding signals (for example, messages, indications, information, pilots, etc.) in accordance with the designated RAT. The wireless device 300 may also generally include a communication controller 320 for controlling operation of the communication device 310 (for example, directing, modifying, enabling, disabling, etc.). The communication controller 320 may operate independently from the host system functionality, illustrated as processing system 330 and memory component 340. Additionally or alternatively, the communication controller 320 may operate at the direction of, or otherwise in conjunction with, respective host system functionality. In some designs, the communication controller 320 may be partly or wholly subsumed by the respective host system functionality.

In the example of FIG. 3, the communication device 310 includes two co-located transceivers operating according to respective RATs, including a primary RAT transceiver 311 and an optional secondary RAT transceiver 312. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (for example, a WiFi chip or similar circuitry simply providing low-level sniffing). Further, as used herein, the term "co-located" (for example, radios, access points, transceivers, etc.) may refer to one of various arrangements. For example, components that are in the same housing; components that are hosted by the same processor; components that are within a defined distance of one another; and/or components that are connected via an interface (for example, an Ethernet switch) where the interface meets the latency requirements of any required inter-component communication (for example, messaging).

The primary RAT transceiver 311 and the secondary RAT transceiver 312 may provide different functionalities and may be used for different purposes. As an example, the primary RAT transceiver 311 may operate in accordance with Long Term Evolution (LTE) technology to provide communication with other nodes, while the secondary RAT transceiver 312 may operate in accordance with WiFi technology to provide communication with other nodes. Additionally or alternatively, the primary RAT transceiver 311 and the secondary RAT transceiver 312 may provide functionalities for LTE-Direct or WiFi-Direct D2D communications.

As will be discussed in more detail below, the communication controller 320 may include an identification manager 322, a metric analyzer 324 and a relay device selector 326, which may operate in conjunction with the primary RAT transceiver 311 and the secondary RAT transceiver 312 to communicate.

Figure 4:
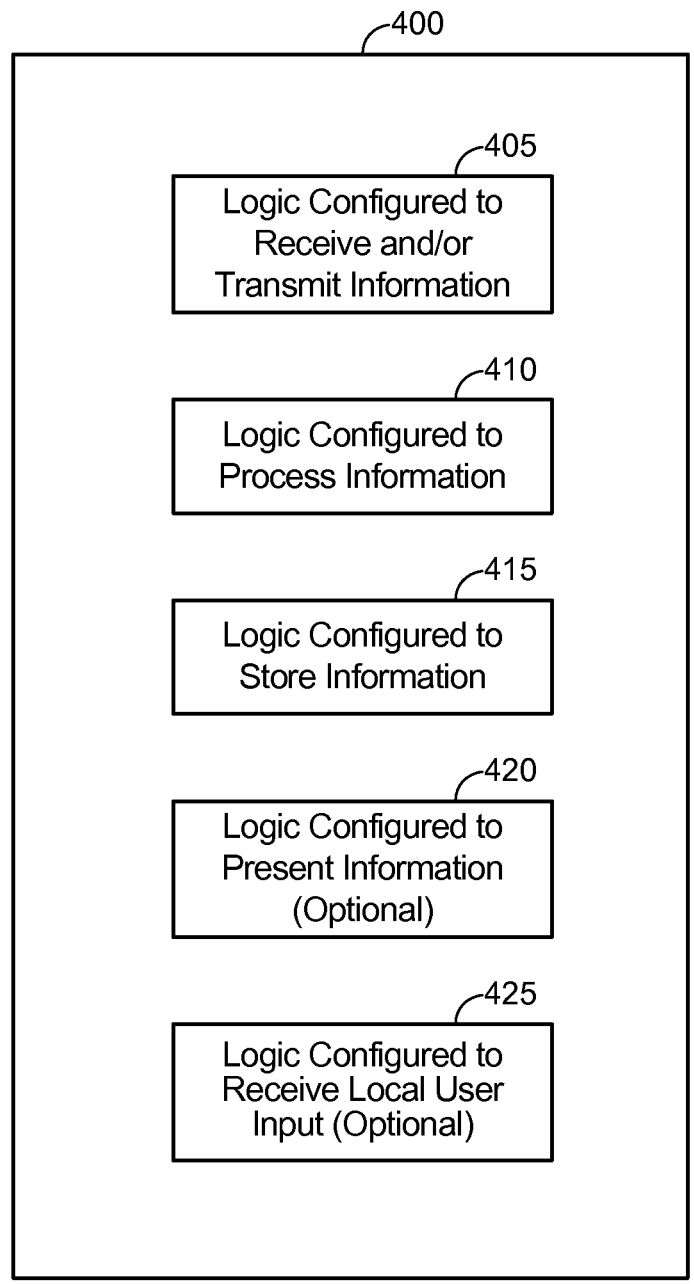
FIG. 4 generally illustrates a wireless device that includes logic configured to perform functionality in accordance with an aspect of the disclosure.

FIG. 4 generally illustrates a communication device 400 that includes logic configured to perform functionality. The communication device 400 can correspond to any of the above-noted communication devices, including but not limited to the wireless devices 120, 130, 140, 142, 144, 200A, 200B, 300, etc. The communication device 400 can correspond to any electronic device that is configured to communicate with (or facilitate communication with) one or more other entities within the wireless environment 100 of FIG. 1.

Referring to FIG. 4, the communication device 400 includes logic configured to receive and/or transmit information 405. In an example, if the communication device 400 corresponds to a wireless device, the logic configured to receive and/or transmit information 405 can include a wireless communication interface (for example, Bluetooth, WiFi, 2G, CDMA, W-CDMA, 3G, 4G, LTE, etc.) such as a wireless transceiver and associated hardware (for example, an RF antenna, a MODEM, a modulator and/or demodulator, etc.). In another example, the logic configured to receive and/or transmit information 405 can correspond to a wired communications interface (for example, a serial connection, a USB or Firewire connection, an Ethernet connection through which the Internet can be accessed, etc.). Thus, if the communication device 400 corresponds to some type of network-based server (for example, PDSN, SGSN, GGSN, S-GW, P-GW, MME, HSS, PCRF, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (for example, an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (for example, between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (for example, a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (for example, a display screen, a port that can carry video information such as USB, HDMI, etc.), an audio output device (for example, speakers, a port that can carry audio information such as a microphone jack, USB, HDMI, etc.), a vibration device, and/or any other device by which information can be formatted for output or actually outputted by a user or operator of the communication device 400. For example, if the communication device 400 corresponds to the wireless device 200A or the wireless device 200B as shown in FIG. 2, the logic configured to present information 420 can include the display 210A of the wireless device 200A or the touchscreen display 205B of the wireless device 200B. In a further example, the logic configured to present information 420 can be omitted for certain communication devices, such as network communication devices that do not have a local user (for example, network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (for example, a microphone or a port that can carry audio information such as a microphone jack, etc.), and/or any other device by which information can be received from a user or operator of the communication device 400. For example, if the communication device 400 corresponds to the wireless device 200A or the wireless device 200B as shown in FIG. 2, the logic configured to receive local user input 425 can include the keypad 220A, any of the buttons 215A or 210B through 225B, the touchscreen display 205B, etc. In a further example, the logic configured to receive local user input 425 can be omitted for certain communication devices, such as network communication devices that do not have a local user (for example, network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
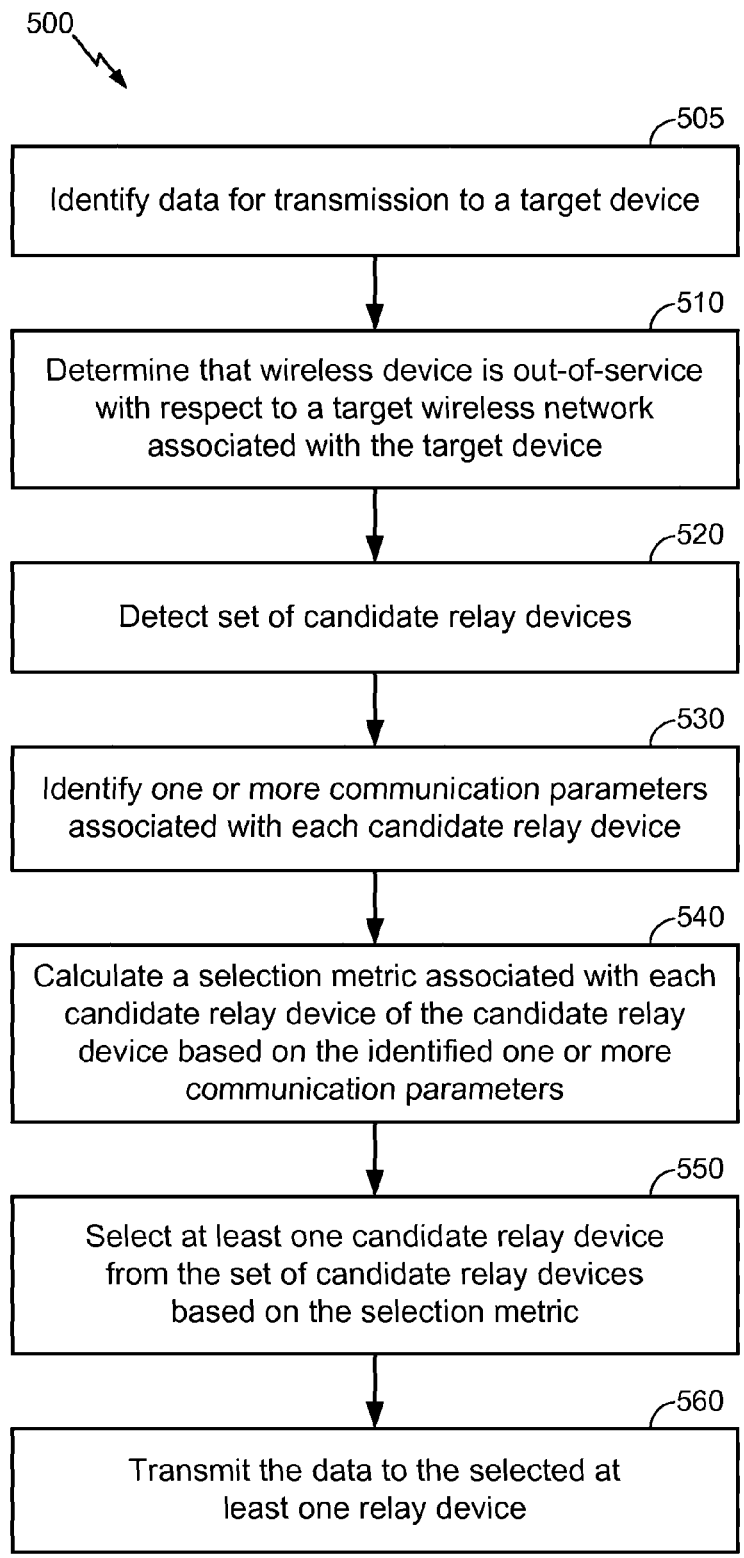
FIG. 5 generally illustrates a method for selecting a relay for D2D communication with a target device in a partial coverage scenario in accordance with an aspect of the disclosure.

FIG. 5 generally illustrates a method 500 for selecting a relay for D2D communication with a target device in a partial coverage scenario in accordance with an aspect of the disclosure. The method 500 may be performed by a wireless device, for example, the wireless device 120 of FIG. 1, the wireless device 300 of FIG. 3, the wireless devices 200A or 200B of FIG. 2, the communication device 400 of FIG. 4, etc. However, for the purposes of illustration, the method 500 will be described below as it would be performed by the wireless device 300.

At 505, the wireless device 300 identifies data for transmission to a target device. The data may be, for example, retrieved from a memory (analogous to, for example, memory 212 or memory component 340), generated by a processor (analogous to, for example, the ASIC 208 or processing system 330), or received from another device (via, for example, the transceiver 206 or the communication device 310).

At 510, the wireless device 300 determines that the wireless device 300 is out-of-service with respect to a target wireless network associated with the target device. For example, the wireless device 300 may be situated similarly to the wireless device 120 of FIG. 1 (i.e., outside the coverage area 111 of the access point 110). In one possible scenario, the wireless device 300 determines that the wireless device 300 is out-of-service by determining that a signal from an access point (analogous to the access point 110 of FIG. 1) has low signal strength (i.e., below a signal strength threshold).

The determination at 510 may be performed by one or more particular components of the wireless device 300, for example, the communication device 310. Additionally or alternatively, the determination at 510 may be performed by the communication controller 320, processing system 330, and/or memory component 340.

At 520, the wireless device 300 detects a set of candidate relay devices. For example, the set of candidate relay devices detected at 520 may be situated similarly to one or more of the candidate relay devices 140, 142, 144 depicted in FIG. 1. In one possible scenario, the wireless device 300 detects the candidate relay device by receiving a D2DSS from the candidate relay devices.

The detection at 520 may be performed by one or more particular components of the wireless device 300, for example, the communication device 310. Additionally or alternatively, the detection at 520 may be performed by the communication controller 320, processing system 330, and/or memory component 340.

At 530, the wireless device 300 identifies one or more communication parameters associated with each candidate relay device of the set of candidate relay devices. In one possible scenario, the one or more communication parameters are identified based on a D2DSS received from the candidate relay device. The D2DSS may be the same D2DSS received at 520 in some implementations. Additionally or alternatively, the D2DSS may be another D2DSS received at a later time.

The measurement at 530 may be performed by one or more particular components of the wireless device 300, for example, the identification manager 322. Additionally or alternatively, the measurement at 530 may be performed by the communication device 310, processing system 330, and/or memory component 340.

At 540, the wireless device calculates a selection metric associated with each candidate relay device of the set of candidate relay devices detected at 520 based on the communication parameters identified at 530. In one possible scenario, each selection metric calculated at 540 reflects the capacity of a particular candidate relay device to serve as a relay to a target device or target network. The target device may be situated similarly to, for example, the target device 130 depicted in FIG. 1.

The calculation at 540 may be performed by one or more particular components of the wireless device 300, for example, the metric analyzer 324. Additionally or alternatively, the calculation at 540 may be performed by the processing system 330 and/or memory component 340.

At 550, the wireless device 300 selecting at least one candidate relay device from the set of candidate relay devices detected at 520 based on the selection metric calculated at 540. In one possible scenario, the selection is performed by comparing the selection metric calculated at 540 to a second selection metric associated with a second relay device in the set of candidate relay devices. The second relay device may be situated similarly to, for example, the candidate relay device 142 or the candidate relay device 144 depicted in FIG. 1.

The selection at 550 may be performed by one or more particular components of the wireless device 300, for example, the relay device selector 326. Additionally or alternatively, the selection at 550 may be performed by the processing system 330 and/or memory component 340.

At 560, the wireless device 300 transmits the data identified at 505 to the selected at least one relay device selected at 550. The target device may be situated similarly to the target device 130 of FIG. 1 and the selected candidate relay device may be situated similarly to the candidate relay device 140 of FIG. 1. In one possible scenario, the transmission is a D2D transmission associated with a D2D communications network. In this scenario, the transmitting at 560 may be synchronized in accordance with the D2DSS received from the candidate relay device 140.

The transmitting at 560 may be performed by one or more particular components of the wireless device 300, for example, the communication device 310. Additionally or alternatively, the determination at 510 may be performed by the communication controller 320, processing system 330, and/or memory component 340.

Figure 6:
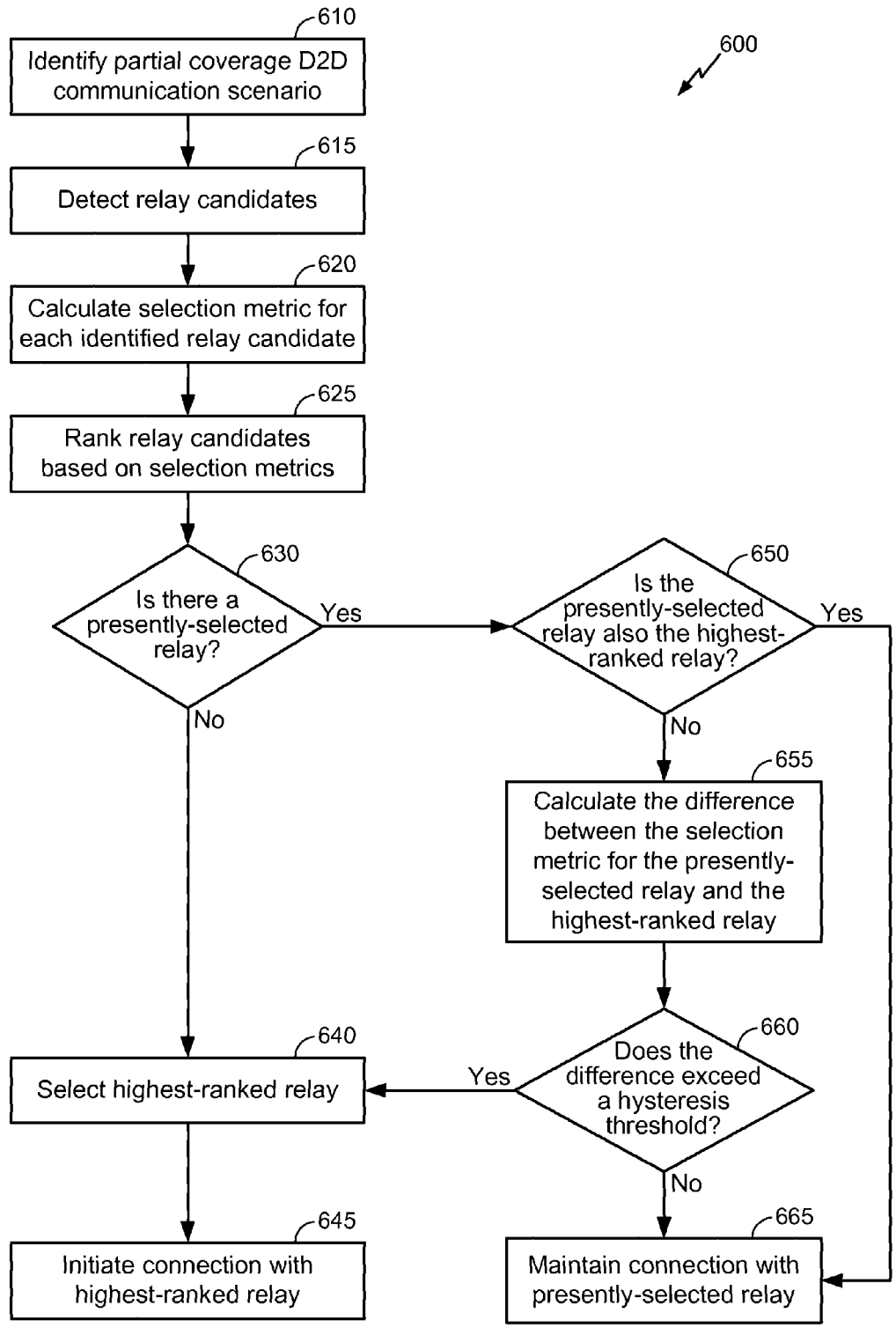
FIG. 6 generally illustrates a method for determining whether to select or reselect in accordance with an aspect of the disclosure.

FIG. 6 illustrates another method 600 for determining whether to select or reselect in accordance with an aspect of the disclosure. The method 600 may be performed in tandem with the method 500 described above (for example, one or more aspects of the method 600 may be used as a substitute or partial substitute for one or more aspects of the method 500). The method 600 may be performed by a wireless device, for example, the wireless device 120 of FIG. 1, the wireless device 300 of FIG. 2, the wireless devices 200A or 200B of FIG. 2, the communication device 400 of FIG. 4, etc. However, for the purposes of illustration, the method 600 will be described below as it would be performed by the wireless device 300.

At 610, the wireless device 300 identifies a partial coverage D2D communication scenario. The partial coverage D2D communication scenario may be similar to, for example, the scenario depicted in the wireless environment 100 depicted in FIG. 1. In one possible implementation, the wireless device 300 identifies a partial coverage scenario by recognizing a loss of coverage (formerly provided by, for example, the access point 110) or an exit from a coverage area (for example, the coverage area 111). Additionally or alternatively, the identification at 610 may be contingent upon a determination that the wireless device 300 wishes to connect (or maintain connection) to a target device (for example, the target device 130 in FIG. 1). In some instances, the target device 130 is assumed to remain in the coverage area 111 based on prior D2D communications. As noted above, the connection to be made (or maintained) may be a D2D connection. Moreover, the identification at 610 may be contingent upon a determination that the wireless device 300 can not connect (or maintain connection) with the target device without an intermediary.

The identification at 610 may be performed by one or more particular components of the wireless device 300, for example, the communication device 310. Additionally or alternatively, the identification at 610 may be performed by the communication controller 320, processing system 330, and/or memory component 340.

At 615, the wireless device 300 identifies a set of relay candidates. In one possible scenario, the wireless device 300 detects a particular candidate relay device by receiving a signal from that candidate relay device. The signal may be, for example, a D2DSS. In some implementations, the D2DSS includes one or more fields that identify the device that transmitted the D2DSS. For example, in the wireless environment 100 depicted in FIG. 1, the wireless device 120 may be able to identify each of the candidate relay devices 140, 142, 144 based on a unique D2DSS received from each.

The identifying that takes place at 615 may also include recording of the identifications, for example, a value that represents a unique identifier or code for each identified candidate relay device.

In some implementations, the set of candidate relay devices detected at 615 includes candidate relay devices that are within direct wireless communication range of the wireless device. Additionally or alternatively, the set of candidate relay devices detected at 615 includes candidate relay devices that are in-service with respect to the target wireless network (analogous to the coverage area 111 depicted in FIG. 1).

The identification at 615 may be performed by one or more particular components of the wireless device 300, for example, the communication device 310. Additionally or alternatively, the identification at 615 may be performed by the communication controller 320, processing system 330, and/or memory component 340.

At 620, the wireless device 300 calculates a selection metric for each of the identified candidate relay devices. In one possible scenario, the selection metrics are calculated based on a D2DSS received from the candidate relay device. The D2DSS used to calculate a selection metric at 620 may be the same as the D2DSS used to identify the candidate relay devices at 615. Additionally or alternatively, the D2DSS may be another D2DSS received at a different time. The calculation at 620 may be implemented using any suitable method, including, for example, the method 700 depicted in FIG. 7 (described elsewhere in the present disclosure). The calculating that takes place at 620 may also include recording of the selection metrics. The selection metrics may, for example, be incorporated into a data array such that they are associated with the identity of the respective candidate relay devices.

The calculation at 620 may be performed by one or more particular components of the wireless device 300, for example, the metric analyzer 324. Additionally or alternatively, the calculation at 620 may be performed by the processing system 330 and/or memory component 340.

At 625, the wireless device 300 ranks each of the candidate relay devices based on the selection metrics calculated at 620. For example, the greatest selection metric may receive the highest rank; the least selection metric may receive the lowest rank, etc. The ranking that takes place at 625 may also include recording of the rankings. The rankings may, for example, be incorporated into a data array such that they are associated with the identity of the respective candidate relay devices.

The ranking at 625 may be performed by one or more particular components of the wireless device 300, for example, the metric analyzer 324. Additionally or alternatively, the ranking at 625 may be performed by the processing system 330 and/or memory component 340.

At 630, the wireless device 300 determines whether there is a presently-selected candidate relay device. For example, the determination at 630 may be a determination as to whether the wireless device 300 will perform a selection or a reselection of a candidate relay device. If there is no presently-selected candidate relay device ('no' in FIG. 6), then the wireless device 300 may select a candidate relay device at 640 (described in greater detail below). On the other hand, if the wireless device 300 has previously selected a candidate relay device ('yes' in FIG. 6), then the wireless device 300 may perform a reselection, in which a different candidate relay device is chosen as intermediary (also described in greater detail below).

As will be understood from the following description, the respective processes for selection and reselection may differ. If the wireless device 300 finds itself in a partial coverage D2D communication scenario for the first time (for example, if the wireless device 300 loses coverage or exits a coverage area while attempting to communicate with a target device over a D2D network), it is appropriate to select the best candidate relay device for relaying signals to the target device. On the other hand, if a candidate relay device has already been selected, then a new and different candidate relay device may only be selected if it is a significantly better candidate. It will be understood that the benefit of establishing a marginally better connection may not exceed the cost of dropping a connection that has already been established.

Returning to FIG. 6, the determination at 630 may be performed by one or more particular components of the wireless device 300, for example, the relay device selector 326. Additionally or alternatively, the determination at 630 may be performed by the processing system 330 and/or memory component 340.

If the wireless device 300 determines at 630 that there is no presently-selected relay ('no' in FIG. 6), then the method 600 proceeds to 640, where the wireless device 300 selects the highest-ranked candidate relay device. The selection at 640 may be performed by one or more particular components of the wireless device 300, for example, the relay device selector 326. Additionally or alternatively, the selection at 640 may be performed by the processing system 330 and/or memory component 340.

At 645, the wireless device 300 initiates a connection with the candidate relay device that is selected at 640. The connection initiated at 645 may be, for example, a D2D connection. Moreover, the connection with the selected candidate relay device may be used to transmit a signal to a target device via the candidate relay device.

The initiation at 645 may be performed by one or more particular components of the wireless device 300, for example, the communication device 310. Additionally or alternatively, the initiation at 645 may be performed by the processing system 330 and/or memory component 340.

If the wireless device 300 determines at 630 that there is a presently-selected relay ('yes' in FIG. 6), then the method 600 proceeds to 650, where the wireless device 300 determines whether the presently-selected relay is also the highest-ranked relay candidate. The determination at 650 may be performed by one or more particular components of the wireless device 300, for example, the relay device selector 326. Additionally or alternatively, the determination at 650 may be performed by the processing system 330 and/or memory component 340.

If the wireless device 300 determines at 650 that the presently-selected relay is also the highest-ranked relay candidate ('yes' in FIG. 6), then the method 600 proceeds to 665, where the wireless device 300 maintains the connection with the presently-selected relay. The connection maintenance at 665 may be performed by one or more particular components of the wireless device 300, for example, the communication device 310. Additionally or alternatively, the connection maintenance at 665 may be performed by the processing system 330 and/or memory component 340.

If the wireless device 300 determines at 650 that the presently-selected relay is not the highest-ranked relay candidate ('no' in FIG. 6), then the method 600 proceeds to 655, where the wireless device 300 calculates the difference between the selection metric for the presently-selected relay and the highest-ranked relay candidate. The calculation is based on the selection metrics calculated at 620 for the presently-selected relay and the highest-ranked relay candidate, respectively.

At 660, the wireless device 300 determines whether the difference calculated at 655 exceeds a hysteresis threshold. The hysteresis threshold may be arbitrarily predetermined and/or modified on the basis of experimental data, analysis, conditions of the wireless device 300, etc. As noted above, the process of reselection (in which one relay connection is dropped in favor of a better connection) may only be worthwhile if the reselection results in a significantly improved connection. By arbitrarily setting/changing the hysteresis threshold, the wireless device 300 can mandate what degree of improvement constitutes a significant improvement.

If the wireless device 300 determines at 660 that the difference calculated at 655 exceeds the hysteresis threshold ('yes' in FIG. 6), then the method 600 proceeds to 640, 645, where (as described above) the wireless device 300 selects the highest-ranked relay candidate and initiates a connection. If, on the other hand, the wireless device 300 determines at 660 that the difference calculated at 655 does not exceed the hysteresis threshold ('no' in FIG. 6), then the method 600 proceeds to 665, where (as described above) the wireless device 300 maintains the connection with the presently-selected relay.

The calculation at 655 and the determination at 660 may be performed by one or more particular components of the wireless device 300, for example, the relay device selector 326. Additionally or alternatively, the calculation at 655 and the determination at 660 may be performed by the processing system 330 and/or memory component 340.

As depicted in FIG. 6, the method 600 terminates upon the initiation of a new connection at 645 or the maintenance of the presently-selected connection at 665. However, it will be understood that the wireless device 300 may repeat the method 600 indefinitely. In one possible implementation, the method 600 begins each new iteration at 610. In this implementation, the wireless device 300 verifies that the wireless device 300 is in a partial coverage D2D communication scenario prior to every iteration of the method 600. In another implementation, the wireless device 300 intermittently verifies that the wireless device 300 is in a partial coverage D2D communication scenario, for example, after a predetermined number of reiterations of the method 600 from which the identification at 610 is omitted, or after a predetermined amount of time since the last performance of the identification at 610.

If the identification at 610 is omitted in any given iteration of the method 600, then the method 600 may begin with the identification of relay candidates at 615 or the calculation of selection metrics at 620. In one possible implementation, the method 600 calculates new selection metrics at 620 once for every new measurement period. In another possible implementation, the calculation of new selection metrics at 620 is performed intermittently, for example, after a predetermined number of measurement periods have passed, after a predetermined number of measurements have been performed, or after a predetermined amount of time since the wireless device 300 last calculated new selection metrics.

Although FIG. 6 depicts a method 600 for determining whether to select or reselect a single candidate relay candidate, it will be understood that a similar method can be performed to select or reselect multiple candidate relay devices. For example, if the selection metrics for multiple candidate relay devices are above a certain threshold, then each of the relay devices that exceed the threshold may be selected. In some implementations, the wireless device 300 may transmit the data redundantly to the target device via each of the multiple candidate relay devices. Alternatively, the wireless device 300 may transmit non-overlapping portions of the data to the target device via each of the multiple candidate relay devices.

Figure 7:
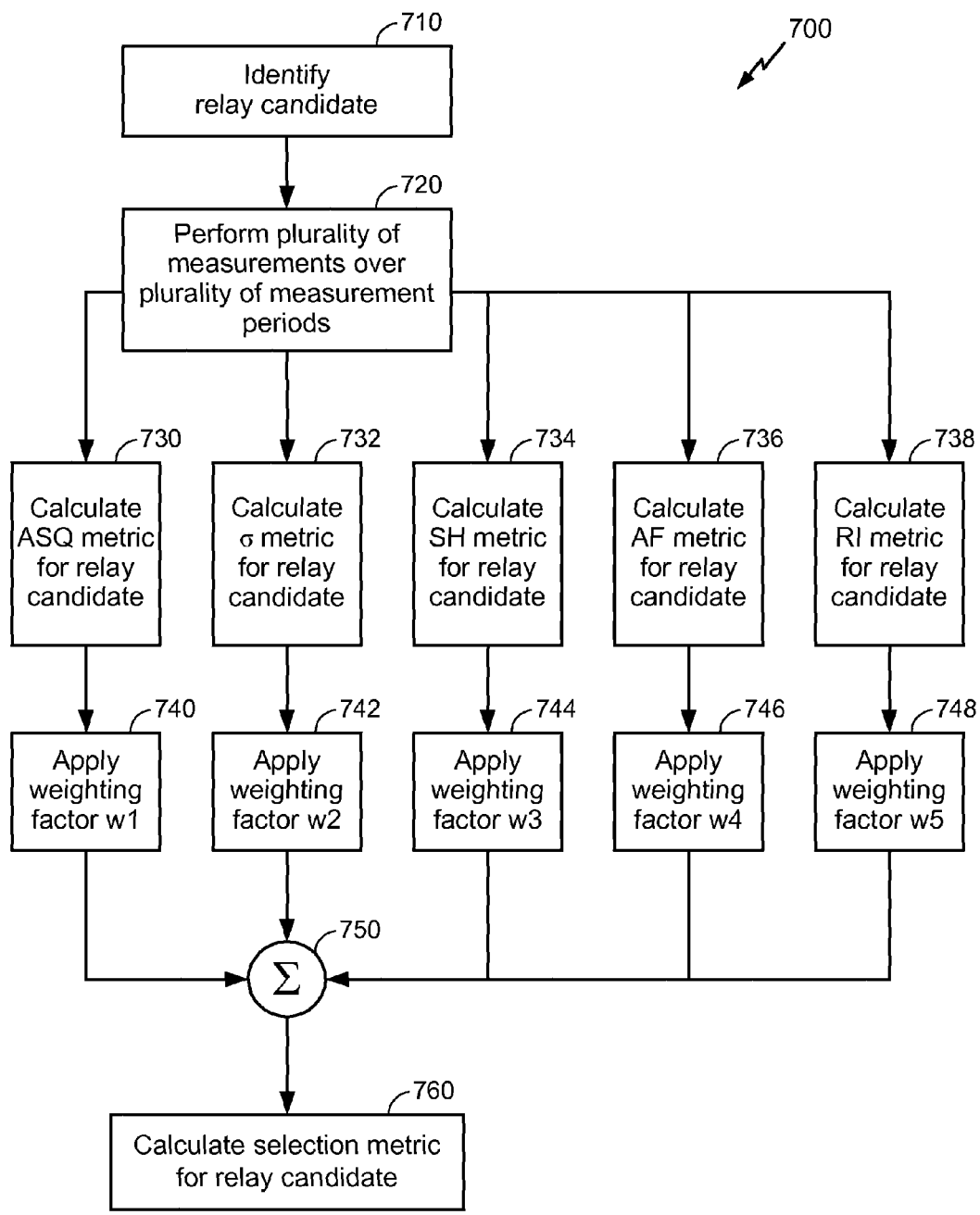
FIG. 7 illustrates a method for calculating a selection metric for a particular candidate relay device.

FIG. 7 illustrates a method 700 for calculating a selection metric for a particular candidate relay device. The method 700 may be performed by a wireless device, for example, the wireless device 120 of FIG. 1, the wireless device 300 of FIG. 3, the wireless devices 200A or 200B of FIG. 2, the communication device 400 of FIG. 4, etc. However, for the purposes of illustration, the method 700 will be described below as it would be performed by the wireless device 300.

The method 700 may be performed as a particular implementation of portions of the method 500 depicted in FIG. 5. For example, the method 700 (as described below) may be performed in order to complete the measurement of one or more communication parameters associated with a candidate relay device as in 530 and the calculation of a selection metric as in 540. Accordingly, the method 700 may be performed in response to the detection of a candidate relay device as in 520. Moreover, the completion of the method 700 may be followed by selection of a candidate relay device as in 550 and transmitting of a signal via the candidate relay device (analogous to the transmitting as in 560).

At 710, the wireless device 300 identifies a candidate relay device. The candidate relay device may be situated similarly to the candidate relay device 140 depicted in FIG. 1. As noted above in the description of FIG. 5, a candidate relay device can be detected by receiving a D2DSS from the candidate relay device. In one possible implementation, the wireless device 300 not only detects but identifies the candidate relay device based on the received D2DSS.

At 720, the wireless device 300 performs a plurality of measurements over a plurality of consecutive measurement periods. The measurements may be performed on the received D2DSS. In one possible implementation, the D2DSS is received during a measurement period that is characterized by a predetermined duration and periodicity. Moreover, during each measurement period, the received D2DSS is measured, and the measurements are recorded for future retrieval and processing. The recording, retrieval and processing may be performed by, for example, the identification manager 322 depicted in FIG. 3. Additionally or alternatively, the recording, retrieval and processing may be performed by the processing system 330 and/or memory component 340 depicted in FIG. 3.

Each measurement performed at 720 may be associated in memory with the candidate relay device identified at 710 and the measurement period in which the measurement was performed. The data may be stored in, for example, an array. For example, if a D2DSS is received from the candidate relay device 140 during a first measurement period, then the result of the measurement performed on the received D2DSS is stored in the array such that it is associated with both the candidate relay device 140 from which it was received and with the first measurement period.

At 730, the wireless device 300 calculates an average signal quality parameter. As used in the present disclosure, average signal quality may be abbreviated as "ASQ". To calculate the ASQ parameter, the wireless device 300 retrieves a plurality of recorded measurements associated with a plurality of measurement periods. For example, the ASQ parameter may correspond to the average received power over the plurality of measurements. In this example, a high average power that is observed over a set time period may indicate that the relay candidate is stationary rather than mobile, and therefore potentially a better candidate. Accordingly, a higher average power will result in a higher ASQ parameter, and a lower average power will result in a lower ASQ parameter.

The number of the plurality of measurements may be determined in any suitable manner. The plurality of measurement periods may include the most recent measurement periods, for example, an integer multiple of recent subframes. The measurement periods may be consecutive. Alternatively, a plurality of intermittent samples of the most recent measurement periods may be retrieved.

At 732, the wireless device 300 calculates a variance parameter. As used in the present disclosure, average signal quality may be abbreviated as "σ". To calculate a σ parameter, the wireless device 300 retrieves a plurality of recorded measurements associated with a plurality of measurement periods. For example, the σ parameter may correspond to a ratio of the peak received power over a plurality of measurements to the average received power over a plurality of measurements. In this example, a low variance that is observed over a set time period may indicate that the relay candidate is stationary rather than mobile, and therefore potentially a better candidate. Accordingly, a low variance will result in a higher σ parameter, and a high variance will result in a lower σ parameter.

The plurality of measurements may be the same measurements as are used to calculate an average signal quality parameter at 730, or may be a different or partially different set of measurements. As noted above, the number of measurements to be retrieved may be determined in any suitable manner. The plurality of measurement periods may include, for example, the most recent measurement periods. Additionally or alternatively, the measurement periods may be consecutive. Alternatively, a plurality of samples of the most recent measurement periods may be retrieved.

At 734, the wireless device 300 calculates a served history parameter. As used in the present disclosure, served history may be abbreviated as "SH". In one possible implementation, the SH parameter reflects whether the relay candidate identified at 710 has served as a relay in the past. For example, if the relay candidate identified at 710 has served as a relay in the past, then the SH parameter may be relatively higher than if the relay candidate identified at 710 has not served as a relay in the past. Additionally or alternatively, the SH parameter may be relatively higher if the relay candidate identified at 710 has served more recently or served more capably.

At 736, the wireless device 300 calculates an age factor parameter. As used in the present disclosure, age factor may be abbreviated as "AF". In one possible implementation, the AF parameter reflects a number of periodic wakeups by the wireless device 300 in which the D2DSS received from the relay candidate identified at 710 exceeds a threshold signal strength. The threshold signal strength may be, for example, a connectivity threshold that is determined to be sufficient to initiate a connection between the wireless device 300 and the relay candidate identified at 710. The age factor parameter may increase with each consecutive wakeup in which the threshold signal strength is exceeded. Additionally, the age factor parameter may decrease or reset if the threshold signal strength is not exceeded.

At 738, the wireless device 300 calculates a reliability information parameter. As used in the present disclosure, reliability information may be abbreviated as "RI". In one possible implementation, the reliability information parameter reflects the network signal strength observed by the relay candidate identified at 710. For example, if the relay candidate identified at 710 observed good network signal strength, then it may be concluded that a handover to a neighboring cell is unlikely. Accordingly, the reliability information parameter associated with a relay candidate that is observing good network signal strength may be relatively higher than a reliability parameter associated with a relay candidate that is observing poor network signal strength. The network signal strength observed by the relay candidate identified at 710 is determined by receiving a network signal strength report from the relay candidate.

Each of the calculations 730, 732, 734, 736, 738 is optional. Accordingly, the method 700 may be performed so long as any one of the calculations 730, 732, 734, 736, 738 (or any combination thereof) is performed. Although FIG. 7 depicts the calculations 730, 732, 734, 736, 738 as being performed in parallel, it will be understood that any the calculations 730, 732, 734, 736, 738 may be performed serially or in parallel with any other of the calculations 730, 732, 734, 736, 738.

At 740, a weighting factor $w_1$ is applied to the ASQ parameter calculated at 730. Analogously, a weighting factor $w_2$ is applied to the σ parameter calculated at 742, a weighting factor $w_3$ is applied to the SH parameter calculated at 744, a weighting factor $w_4$ is applied to the AF parameter calculated at 746, and a weighting factor $w_5$ is applied to the RI parameter calculated at 748. The weighting factors $w_1$, $w_2$, $w_3$, $w_4$, and $w_5$ may be arbitrarily predetermined and/or modified on the basis of experimental data, analysis, conditions of the wireless device 300, etc. Additionally or alternatively, the weighting factors $w_1$, $w_2$, $w_3$, $w_4$, and $w_5$ may be used to resolve differences of unit for each of the parameters.

At 750, the wireless device 300 calculates the sum of the weighted parameters. It will be understood that each weighted parameter is equal to the product of a given parameter with its respective weighting factor, and the sum of the weighted parameters is equal to the sum of the products. As noted above, each of the calculations 730, 732, 734, 736, 738 is optional. However, in a scenario where each of the calculations 730, 732, 734, 736, 738 is performed, the sum of the weighted parameters (E) for the $i^{th}$ relay candidate ($\Sigma_i$) will be equal to $w_1*ASQ_i + w_2*\sigma_i + w_3*SH_i + w_4*AF_i + w_5*RI_i$.

At 760, the wireless device 300 calculates a selection metric associated with the relay candidate identified at 710. The calculating at 760 may include recording the sum of the weighted parameters Σ for future retrieval and/or forwarding the sum of the weighted parameters Σ from the component of the wireless device 300 in which it is calculated to another component of the wireless device 300. As noted above, the sum of the weighted parameters Σ may be recorded and/or forwarded such that the value is associated with the relay candidate identified at 710. As noted above in the description of FIG. 5, a selection metric such as the selection metric calculated at 760 may be used to select a candidate relay device (as at 550) and transmit a signal to a target device (as at 560).

It will be understood that the wireless device 300 may perform the method 700 multiple times. In one possible implementation, the wireless device 300 performs the method 700 once for each D2DSS that is received during a particular measurement period. For example, if three different D2DSS are received from three different relay candidates (i=1, 2, 3) in a given measurement period, then the method 700 may be performed once for each received D2DSS. In this example, the wireless device 300 would calculate at 560 three different selection metrics based on the respective sums calculated at 550 ($\Sigma_1$, $\Sigma_2$, and $\Sigma_3$).

Because the method 700 calculates a unique selection metric for each identified relay candidate, a selection of a candidate relay wireless device (such as the selection at 550) can be performed on the basis of the respective selection metrics. In one possible example, the wireless device 300 selects the candidate relay device by comparing the respective selection metrics and selecting the candidate relay device associated with the highest selection metric.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences, and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device. In the alternative, the processor and the storage medium may reside as discrete components in a user terminal.

In one or more exemplary embodiments, the functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps, and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a wireless device, comprising:
   identifying data for transmission to a target device;
   determining that the wireless device is out-of-service with respect to a target wireless network associated with the target device;
   detecting a set of candidate relay devices;
   identifying one or more communication parameters associated with each candidate relay device of the set of candidate relay devices, wherein the one or more communication parameters include one or more of the group consisting of:
   an average signal quality parameter (ASQ) calculated by calculating an average of a plurality of signal quality measurements associated with a plurality of measurement periods;
   a served history parameter (SH) calculated by determining whether the candidate relay device has previously served as a relay device;
   an age factor parameter (AF) calculated by calculating a number of consecutive periodic wakeups by the wireless device in which a signal strength of a signal received from the candidate relay device exceeds a connectivity threshold; and a reliability information parameter (RI) calculated by determining network signal strength observed by the candidate relay device;

calculating a selection metric associated with each candidate relay device of the set of candidate relay devices based on the identified one or more communication parameters;

selecting at least one candidate relay device from the set of candidate relay devices based on the selection metric; and transmitting the data to the selected at least one candidate relay device.

2. The method of claim 1, wherein the one or more communication parameters include a variance parameter ($\sigma$) calculated by calculating a variance of a plurality of signal quality measurements associated with a plurality of measurement periods.

3. The method of claim 1, wherein the one or more communication parameters includes a plurality of communication parameters, each of the plurality of communication parameters associated with a respective weighting factor.

4. The method of claim 3, wherein calculating a selection metric based on the plurality of communication parameters comprises calculating products of each of the plurality of communication parameters with the respective weighting factors, and calculating a sum of the products.

5. The method of claim 1, wherein selecting the candidate relay device based on the selection metric comprises:

comparing the selection metric of the candidate relay device to a second selection metric of a second relay device;

selecting the candidate relay device based on a determination that the candidate relay device is already being used to communicate with the target device and that a difference between the second selection metric of the second relay device and the selection metric of the candidate relay device does not exceed a hysteresis threshold.

6. The method of claim 1, wherein selecting the candidate relay device based on the selection metric comprises:

comparing the selection metric of the candidate relay device to a second selection metric of a second relay device;

selecting the candidate relay device based on a determination that a difference between the selection metric of the candidate relay device and the second selection metric of the second relay device exceeds a hysteresis threshold.

7. The method of claim 1, wherein:

detecting the set of candidate relay devices comprises detecting a set of candidate relay devices that are within direct wireless communication range of the wireless device and are in-service with respect to the target wireless network; and transmitting the data to the selected at least one candidate relay device comprises relaying the data to the target device via the selected at least one candidate relay device.

8. The method of claim 1, wherein selecting the at least one candidate relay device includes:

selecting a single candidate relay device; or
selecting multiple candidate relay devices.

9. The method of claim 8, wherein selecting the at least one candidate relay device comprises selecting the multiple candidate relay devices, and wherein the transmitting comprises:

transmitting the data redundantly to the target device via each of the multiple candidate relay devices; or transmitting non-overlapping portions of the data to the target device via each of the multiple candidate relay devices.

10. A wireless device comprising:

a communication device configured to identify data for transmission to a target device, determine that the wireless device is out-of-service with respect to a target wireless network associated with the target device, detect a set of candidate relay devices, and transmit the data to the target device via a selected at least one relay device;

an identification manager configured to identify one or more communication parameters associated with each candidate relay device of the set of candidate relay devices, wherein the one or more communication parameters include one or more of the group consisting of:

an average signal quality parameter (ASQ) calculated by calculating an average of a plurality of signal quality measurements associated with a plurality of measurement periods;

a served history parameter (SH) calculated by determining whether the candidate relay device has previously served as a relay device;

an age factor parameter (AF) calculated by calculating a number of consecutive periodic wakeups by the wireless device in which a signal strength of a signal received from the candidate relay device exceeds a connectivity threshold; and a reliability information parameter (RI) calculated by determining network signal strength observed by the candidate relay device;

a metric analyzer configured to calculate a selection metric associated with each candidate relay device of the set of candidate relay devices based on the identified one or more communication parameters; and a relay device selector configured to select at least one candidate relay device from the set of candidate relay devices based on the selection metric.

11. The wireless device of claim 10, wherein the one or more communication parameters include a variance parameter ($\sigma$) calculated by calculating a variance of a plurality of signal quality measurements associated with a plurality of measurement periods.

12. The wireless device of claim 10, wherein the one or more communication parameters includes a plurality of communication parameters, each of the plurality of communication parameters associated with a respective weighting factor.

13. The wireless device of claim 12, wherein the metric analyzer is further configured to calculate a selection metric based on the plurality of communication parameters by calculating products of each of the plurality of communication parameters with the respective weighting factors, and calculating a sum of the products.

14. The wireless device of claim 10, wherein the relay device selector is further configured to:

compare the selection metric of the candidate relay device to a second selection metric of a second relay device;

select the candidate relay device based on a determination that the candidate relay device is already being used to communicate with the target device and that a difference between the second selection metric of the second relay device and the selection metric of the candidate relay device does not exceed a hysteresis threshold.

15. The wireless device of claim 10, wherein selecting the candidate relay device based on the selection metric comprises:
compare the selection metric of the candidate relay device to a second selection metric of a second relay device;
select the candidate relay device based on a determination that a difference between the selection metric of the candidate relay device and the second selection metric of the second relay device exceeds a hysteresis threshold.

16. The wireless device of claim 10, wherein the communication device is further configured to:
detect the set of candidate relay devices by detecting a set of candidate relay devices that are within direct wireless communication range of the wireless device and are in-service with respect to the target wireless network; and
transmit the data to the target device via the selected at least one relay device by relaying the data to the target device via the selected at least one candidate relay device.

17. The wireless device of claim 10, wherein the selected at least one candidate relay device includes:
a single candidate relay device; or
multiple candidate relay devices.

18. The wireless device of claim 17, wherein the selected at least one candidate relay device includes the multiple candidate relay devices, and wherein is further configured to transmit the data to the target device via the selected at least one relay device by:
attempting to transmit the data to the target wireless network via each of the multiple candidate relay devices redundantly; or
transmitting non-overlapping portions of the data to the target wireless network via each of the multiple candidate relay devices.

19. A wireless device apparatus configured to select a relay device, comprising:
means for identifying data for transmission to a target device;
means for determining that the wireless device is out-of-service with respect to a target wireless network associated with the target device;
means for detecting a set of candidate relay devices;
means for identifying one or more communication parameters associated with each candidate relay device of the set of candidate relay devices, wherein the one or more communication parameters include one or more of the group consisting of:
an average signal quality parameter (ASQ) calculated by calculating an average of a plurality of signal quality measurements associated with a plurality of measurement periods;
a served history parameter (SH) calculated by determining whether the candidate relay device has previously served as a relay device;
an age factor parameter (AF) calculated by calculating a number of consecutive periodic wakeups by the wireless device in which a signal strength of a signal received from the candidate relay device exceeds a connectivity threshold; and
a reliability information parameter (RI) calculated by determining network signal strength observed by the candidate relay device;
means for calculating a selection metric associated with each candidate relay device of the set of candidate relay devices based on the identified one or more communication parameters;
means for selecting at least one candidate relay device from the set of candidate relay devices based on the selection metric; and
means for transmitting the data to the selected at least one candidate relay device.

20. The wireless device apparatus of claim 19, wherein the one or more communication parameters include a variance parameter ($\sigma$) calculated by calculating a variance of a plurality of signal quality measurements associated with a plurality of measurement periods.

21. A non-transitory computer-readable medium comprising code, which, when executed by a processor, causes the processor to perform operations for selecting a relay device, the non-transitory computer-readable medium comprising:
code for identifying data for transmission to a target device;
code for determining that the wireless device is out-of-service with respect to a target wireless network associated with the target device;
code for detecting a set of candidate relay devices;
code for identifying one or more communication parameters associated with each candidate relay device of the set of candidate relay devices, wherein the one or more communication parameters include one or more of the group consisting of:
an average signal quality parameter (ASQ) calculated by calculating an average of a plurality of signal quality measurements associated with a plurality of measurement periods;
a served history parameter (SH) calculated by determining whether the candidate relay device has previously served as a relay device;
an age factor parameter (AF) calculated by calculating a number of consecutive periodic wakeups by the wireless device in which a signal strength of a signal received from the candidate relay device exceeds a connectivity threshold; and
a reliability information parameter (RI) calculated by determining network signal strength observed by the candidate relay device;
code for calculating a selection metric associated with each candidate relay device of the set of candidate relay devices based on the identified one or more communication parameters;
code for selecting at least one candidate relay device from the set of candidate relay devices based on the selection metric; and
code for transmitting the data to the selected at least one candidate relay device.

22. The non-transitory computer-readable medium of claim 21, wherein the one or more communication parameters include a variance parameter ($\sigma$) calculated by calculating a variance of a plurality of signal quality measurements associated with a plurality of measurement periods.

* * * * *